Dec. 17, 1968  F. W. FORK  3,417,191
DUAL FUNCTION ELECTRICAL OUTLET AND ELECTRICAL
DISTRIBUTION SYSTEM UTILIZING THE SAME
Filed Feb. 14, 1966  2 Sheets-Sheet 1

INVENTOR.
FRANK W. FORK
BY
*Harry B. Keck*
ATTORNEY

Dec. 17, 1968 F. W. FORK 3,417,191
DUAL FUNCTION ELECTRICAL OUTLET AND ELECTRICAL
DISTRIBUTION SYSTEM UTILIZING THE SAME
Filed Feb. 14, 1966 2 Sheets-Sheet 2
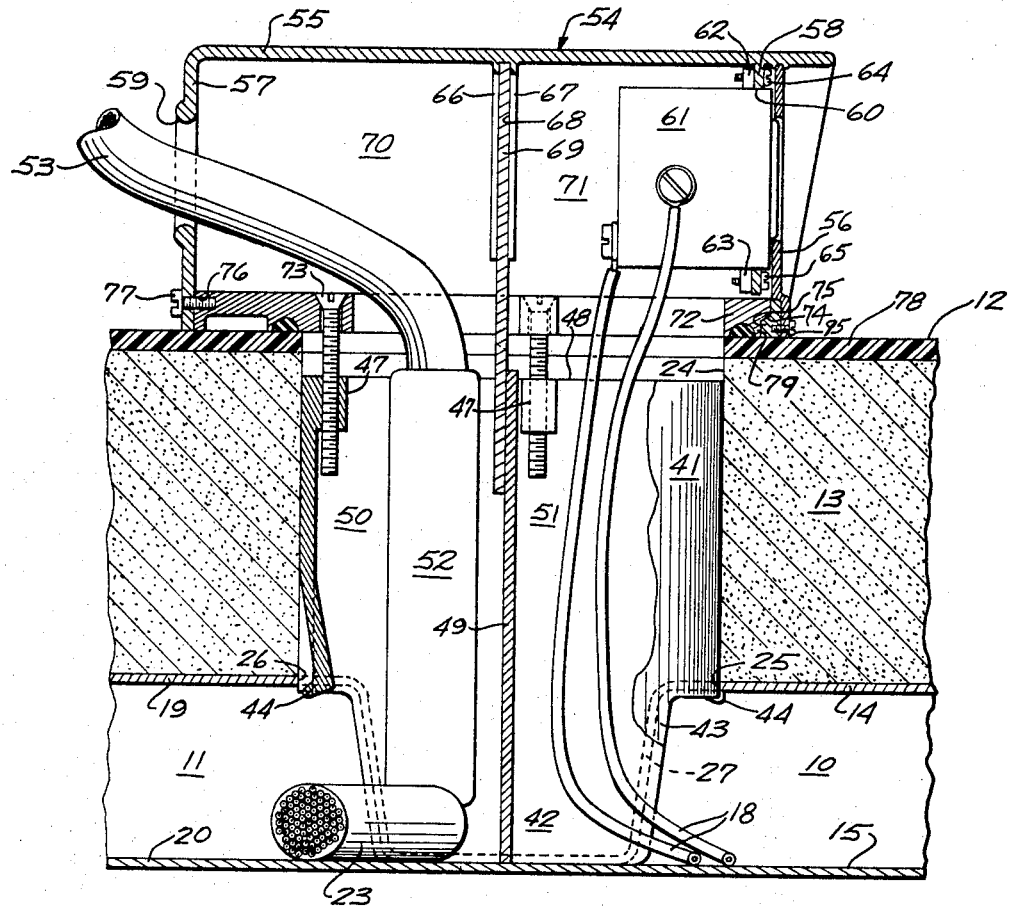
Fig. 3
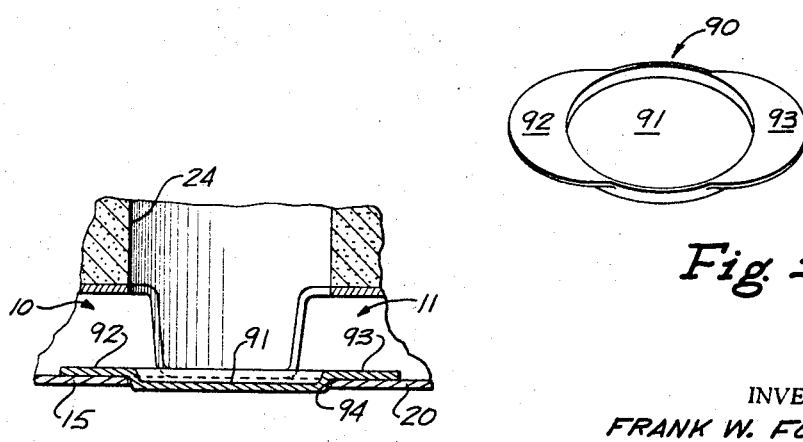
Fig. 5
Fig. 6
INVENTOR.
FRANK W. FORK
BY
Harry B. Keck
ATTORNEY United States Patent Office 3,417,191
Patented Dec. 17, 1968

3,417,191
DUAL FUNCTION ELECTRICAL OUTLET AND ELECTRICAL DISTRIBUTION SYSTEM UTILIZING THE SAME
Frank W. Fork, Allison Park, Pa., assignor to H. H. Robertson Company, Pittsburgh, Pa., a corporation of Pennsylvania
Filed Feb. 14, 1966, Ser. No. 535,282
7 Claims. (Cl. 174—49)

ABSTRACT OF THE DISCLOSURE

An electrical outlet unit including an improved base cup and a coordinated duel outlet fitting. The base cup is adapted to extend between arcuate openings provided in each of two adjoining electrical raceways. Separator means divide the interior of the base cup into two chambers each communicating with one of the adjacent raceways. The dual outlet fitting is secured to the base cup and is disposed above the floor. Separator means within the dual outlet fitting divides the interior of the fitting into two enclosed chambers communicating with the chambers of the base cup. Separate transmission of the electrical wiring from the adjacent cells through the two enclosed chambers to the outlet unit is possible.

---

This invention relates to a dual function electrical outlet unit which is particularly adapted for use with covered electrical raceways of the type usually placed in building floors. More particularly this invention concerns dual function electrical outlets and an improved electrical distribution system for buildings utilizing the same.

Prior art

In the construction of modern buildings, electrical conductors are disposed beneath the building's surfaces, usually floors but sometimes walls and ceilings, in enclosed metal raceways. Where the building is constructed with cellular metal flooring as shown, for example, in U.S. Patents 2,445,197 or 2,931,533, the metal cellular flooring provides individual enclosed cells which serve as electrical raceways. Electrical conductors for different functions are maintained in independent, separate raceways. The telephone wiring, for example, is provided in a wholly independent raceway system which is different and separate from the power wiring. The telephone wiring is usually low voltage material. The telephone conductors deliver complex signals which can be seriously altered by electromagnetic phenomena resulting from adjacent high voltage conductors. The enclosed raceway shields the telephone wiring from such hazards. The power conductors, usually maintained at 110 or 220 volts, are confined in a separate and independent electrical raceway.

In buildings which do not utilize metal cellular flooring, metal raceway units are provided beneath the flooring surface as shown, for example, in U.S. Patent 3,061,663. The separation of individual electrical services (telephone, signal, power) is maintained in the such underfloor raceway units.

Other forms of underfloor raceways which are neither cellular metal flooring units nor conventional metal raceway units are described in U.S. Patents 2,854,840 and 2,912,848. The underfloor distribution systems of these two references are likewise amenable to use with the present invention.

A plurality of electrical conductor outlets has been developed for delivering electrical conductors from such underfloor raceways to the interior of the building for active use. Typical units are shown in U.S. Patents 2,297,-179, 2,932,683, 3,047,650. Special purpose outlet units for telephone signal conductors are shown, for example, in U.S. Patents 3,023,265 and 4,110,538. Because of requirement form keeping power conductors separate from telephone and signal conductors, separate outlets are provided for delivering the power conductors to the interior of the building and separate outlet units are provided for delivering the telephone and signal conductors to the interior of the building.

More recently, divided raceways have been made available which include a lengthwise divider strip in a single enclosed sheet metal raceway. Preset dual electrical outlets have been developed for use with such divided raceways to permit separate withdrawal of electrical conductors of different functions from the two divided channels of the divided raceway into the interior of the building for use. These dual outlets are not adapted to be installed after the covering concrete layer has been applied above the divided, enclosed sheet metal raceways. Instead these dual outlet units are installed in association with the divided raceways prior to the pouring of the concrete floor covering.

The present invetion

According to the present invention, an electrical outlet unit is provided which includes an improved base cup and a coordinated dual outlet which is adapted to receive electrical wiring of different functions from a pair of adjacent sheet metal raceways which are disposed beneath a building surface, such as a floor, and are covered by a filling material, such as concrete. The present base cup and outlet can be applied at the time of the building construction, that is, prior to the pouring of concrete. Alternatively the present base cup and outlets can be applied ralatively simple at any time during the life of the building, that is, after the concrete covering fill has been poured and hardened.

The base cup of this invention includes an essentially cylindrical body portion and a pair of depending skirts which are adapted to extend between arcuate openings which are provided in each of two adjoining sheet metal electrical raceways. The interior edges of the base cup are rounded and smooth so that the skirts and body portion serve as a grommet to minimize the abrasion and scoring of electrical wiring. A vertical separator plate is disposed within the base cup as a secant-plane, dividing the base cup interior into two essentially enclosed chambers, one of which communicates with the first of the raceways and the other of which communicates with the adjacent raceways. The base cup is equipped with means for mechanical attachment to the electrical raceways providing not only a rigid engagement but also an electrical grounding connection between the raceway and the base cup.

The dual outlet unit is provided with suitable fastening means and is aesthetically arranged to be attractive when secured to the base cup above the building surface, e.g., above the floor. The outlet unit has a housing which likewise has a vertical separator plate to cooperate with the saparator plate of the base cup to continue the two enclosed chambers for separate transmission of electrical wiring. The housing moreover has a first separate outlet for the telephone conductors and a second separate outlet for the power conductors. In a preferred embodiment, the housing has means for fastening an electrical plug receptacle and also has an opening in a side wall for receiving electrical plugs into the mounted receptacle.

Objects

The principal object of this invention is to provide an electrical outlet fitting which is adapted to deliver both power and telephone conductors from an underfloor pair of sheet metal electrical raceways.

A further object of this invention is to provide a dual function electrical outlet which can be installed prior to the pouring of a concrete layer or subsequent to the pouring and hardening of a concrete layer in a building having electrical raceways beneath a building surface, such as a floor.

A further object of the invention is to provide an improved electrical base cup.

A still further object of the invention is to provide an improved electrical distribution system utilizing the present electrical base cup and dual function electrical outlet.

These and other objects and advantages of the present invention will become apparent from the following detailed description with reference to the accompanying drawings in which:

FIGURE 3 is a fragmentary cross-section view taken through a pair of adjacent sheet metal electrical raceways disposed beneath the floor of a typical building showing the present electrical base cup and dual function electrical outlet unit in a typical environment;

FIGURE 5 is a perspective illustration of a cap element; and

FIGURE 6 is a fragmentary cross-section view similar to a portion of the view of FIGURE 2 showing the cap element of FIGURE 5.

Figure 1:
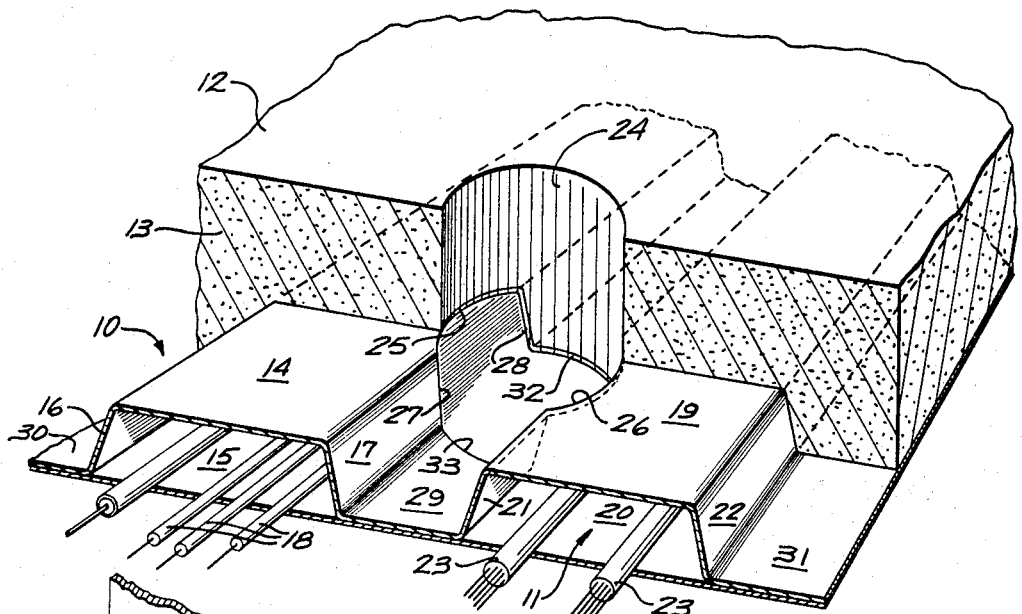
FIGURE 1 is a fragmentary, broken away, perspective view of typical sheet metal raceways or metal cellular flooring cells which are adapted to the practice of the present invention.

As shown in FIGURE 1, typical sheet metal raceways 10, 11 are provided beneath a building surface 12 which is usually a floor. The metal raceways 10, 11 are covered with a layer of suitable filler material 13 which is usually concrete. The electrical raceways 10, 11 may be components of a metal cellular flooring section of the type shown in U.S. Patents 2,445,197, 2,931,533, 2,949,413. The raceway 10 has a top wall 14, a bottom wall 15 and a pair of side walls 16, 17 which cooperate to form an enclosed passageway for electrical power conductors 18 which are delivered through the raceway 10 to the desired locations throughout the building. The raceway 11 has a top wall 19, a bottom wall 20, side walls 21, 22 which cooperate to define an enclosed passageway for the delivery of telephone cables 23, usually of the multi-conductor variety, throughout a building.

When the present invention is applied to an existing building, a circular cross-section bore 24 is cut vertically through the building surface 12 and through the filler material 13 to the bottom of the electrical raceways. The circular cross-section bore 24 defines an arcuate rim 25 in the top wall 14 and a corresponding arcuate rim 26 in the top wall 19. Straight line cut surfaces 27, 28 are introduced into the side wall 17 by the bore 24. Similar straight line cut surfaces are presented in the side wall 21 but are not exposed to view in FIGURE 2.

The electrical raceways 10, 11 may be formed from two sheets of metal including an essentially flat bottom sheet which serves as both bottom surface 15, 20 and a corrugated upper sheet which includes the side wall 16, 17, 21, 22 as well as the top walls 14, 19 and intermediate valley surfaces 29, 30, 31. The valley surface 29 will be cut-away by the bore 24 along arcuate lines 32, 33.

The bore 24 provides an opening in the raceway 10 defined by the arcuate lip 25, the straight-line cut surfaces 27, 28 and the bottom surface 15. A corresponding opening is provided in the raceway 11.

Figure 2:
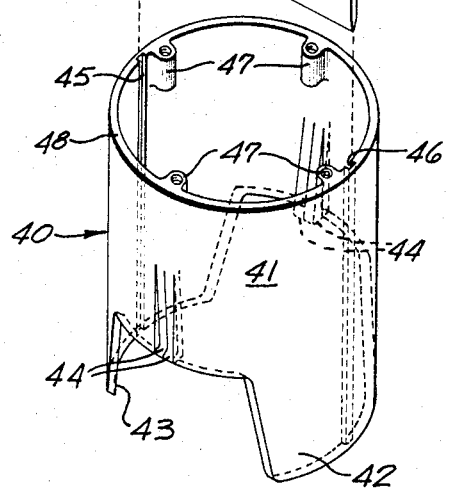
FIGURE 2 is a perspective illustration of an improved electrical base cup according to this invention.

An electrical base cup 40 as shown in FIGURE 2, is provided for entry into the cylindrical bore 24. The base cup 40 is preferably formed from metals by casting techniques. The base cup 40 has an essentially cylindrical body portion 41 with a pair of depending skirts 42, 43 extended longitudinally from the body portion 41. The periphery of the base cup 40 is cylindrical in order that it can engage in the bore 24. A fastening means is provided along the body portion 41 in the form of locking nibs 44 which are formed by longitudinal cuts or grooves in the body portion 41 which are adapted to be hammered outwardly into engagement with the undersurface of the sheet 14 or the sheet 19 or both. The locking nibs 44 are disposed between the skirts 42, 43.

The configuration of the skirts 42, 43 is such that they will extend from one straight line cut surface 27 to its counterpart in the electrical raceway 11; the other skirt will extend from the straight line cut surface 28 to its counterpart in the raceway 11. A pair of divider slots 45, 46 is provided lengthwise along the interior wall of the base cup 40 essentially parallel with the cylindrical axis. The divider slats 45, 46 receive a flat metal divider plate 49 which extends along the length of the base cup 40 and serves to divide the body portion 41 into two semi-circular cross-section chambers. A number of screw-receiving bosses 47, each with a screw receiving hole, is provided along the interior of the upper rim 48 of the cylindrical body portion 41.

The electrical base cup 40 fits within the bore 24 seen in FIGURE 3. The vertical divider plate 49 divides the electrical base cup into two chambers 50, 51. The locking nibs 44 are shown engaged beneath the arcuate rim 26 of the raceway 11. The outline of the skirt 42 is seen to extend into the cross-section of the raceways 11, 10 so that any roughness and ragged edges or burrs along the cut surfaces 27, 28 of the raceways will be shielded by the skirt 42 from contact with conductors entering into the base cup 40 from the raceways 11, 10. A multi-conductor telephone cable 23 extends from the interior of the raceway 11 between the skirts 42, 43 (not seen in FIGURE 3) of the base cup 40 and communicates with an Amphenol multi-junction connector element 52 which is positioned within the chamber 50 with its longitudinal axis vertically disposed. The Amphenol connector element 52 is joined with a corresponding Amphenol multi-junction connector element which is electrically connected with an interior telephone cable 53 extending above the floor level 12 of the building. Electrical power conductors 18 are delivered from the interior of the raceway 10 through the chamber 51 above the level 12 of the building floor. A dual function electrical outlet unit 54 includes a casing with a top wall 55 and side walls 57, 58. The side wall 57 has a lipped or grommeted aperture 59 through which the telephone cable 53 extends into the interior of the building. The side wall 58 is recessed and has an aperture 60 which receives the front face of an electrical plug receptacle 61. The receptacle 61 has a pair of brackets 62, 63 by which it is mounted rigidly within the casing by means of screws 64, 65, respectively. A cover plate 56 fits over the aperture 60 to provide a decorative appearance. The cover plate 56 is secured by a screw 95 to the side wall 58. A pair of bead members 66, 67 define a channel 68 for receiving and retaining a vertical divider plate 69 which depends below the floor level 12 and engages the divider plate 49 in the base cup 40. The divider plate 69 separates the interior of the outlet unit 54 into a pair of chambers 70, 71 which communicate respectively with the chambers 50, 51.

An annular mounting plate 72 of any convenient design is applied at the floor level 12 and is secured to the base cup 40 by means of screws 73 which extend into the bosses 47. The outlet unit 54 with its separator plate 69 is secured to the mounting plate 72 in any suitable rigid manner. For example, the right hand edge of the base plate 72 may be undercut with a shelf 74 to receive a tongue 75 in the side wall 58. The opposite side wall 57 has a screw receiving aperture 76 through which a screw 77 is secured to the base plate 72.

Overall the present dual function electrical outlets provide a totally enclosed passageway for the delivery of telephone cables to the interior of a building from an underfloor raceway 11. That enclosed passageway includes the chamber 50 and the chamber 70. Likewise the structure provides a totally enclosed passageway from the interior of the raceway 10 including the chamber 51 and the chamber 71 for power electrical conductors. The outlet unit 54 is electrically grounded to the raceway system through the screws 77, 73 and the clocking nibs 44 which are in grounding engagement with the surface 19. Moreover the Amphenol multi-junction connectors 52 are conveniently stored below the level 12 of the floor. Where larger telephone connector elements are required than the Amphenol connectors 52, the casing of the outlet unit 54 may be enlarged in the chamber 70 to accommodate larger multi-junction connector elements in a horizontal disposition above the level 12 of the floor in a manner similar to that illustrated and described in U.S. Patent 3,110,538. Alternatively, telephone junction blocks of the type shown in U.S. Patent 3,083,857 may be readily accommodated.

The present electrical base cup 40 can be secured in the building structure in he manner described in U.S. Patents 3,053,013 and 3,043,014 if desired. Suitable electrical grounding connections to the underfloor raceways should be provided for such base cup fastening techniques.

The vertical divider plate 69 should be adapted to engage the vertical divider strip 49 over a substantial distance to accommodate different thicknesses of concrete 13 which are encountered in typical modern buildings. Suitable floor covering material 78 may be provided in the form of linoleum, tile, carpeting, wood inlay, and the like.

Referring to the illustration in FIGURE 1, the valley sheet 29 is cut along arcuate edges 32,33 leaving behind, essentially unaffected, the bottom sheet which forms the bottom walls 15,20. It should be apparent that the cutting operation may, on occasion, entirely pass through the bottom sheet, leaving a circular aperture in the floor extending entirely through to the subjacent building room. In some instances this complete cut-through may be a preferred procedure.

Figure 4:
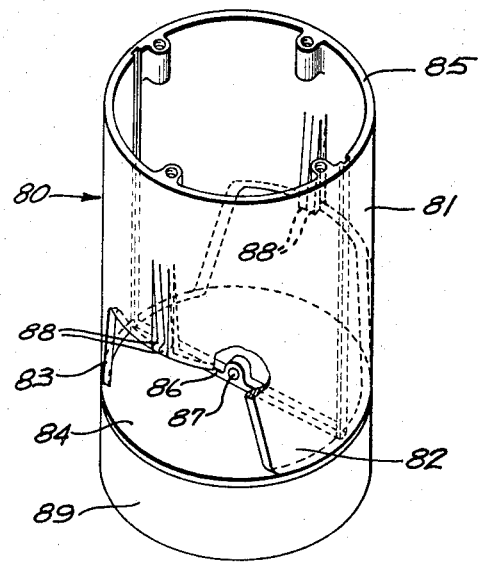
FIGURE 4 is a perspective illustration, similar to FIGURE 2, showing an alternative embodiment of the present electrical base cup.

The alternative embodiment of the electrical base cup 80 shown in FIGURE 4 is intended to be used in either of these two situations. As shown, the modified base cup 80 has a cylindrical body portion 81, a pair of skirt members 82,83 which are joined at their bottom end to a circular metal disk 84 which lies in a plane essentially parallel to the plane of the upper rim 85. A central boss 86 is provdied above the disk 84. A horizontal hole 87 in the boss 86 provides a mounting support means for retaining the base cup 80 until locking nibs 88 can be set. For example, a horizontal stiff wire may be passed through the hole 87 and allowed to rest against the surfaces of the bottom sheets 15,20 to support the base cup vertically within a bore at the required level until permanent fastening can be achieved.

If desired, a plug 89 of suitable fireproofing material may be adhered to the undersurface of the disk 84 to provide continuity of fireproofinig coating of the flooring structure without requiring a patching operation to be performed beneath the level of the floor.

While the present dual function electrical outlet and base cup has an especial desirability in its use with already-installed and covered metal raceways, it should be apparent that the units can be easily installed before a concrete layer is poured above the metal cellular flooring or underfloor metal raceways. The metal base cups can be provided with a blind cover plate which can be exposed and removed when it is desired to activate the electrical services which are available in the raceways. The use of blind cover plates for this purpose is well known in the underfloor raceways art.

A further alternative closer cap is illustrated in FIGURES 5 and 6. The cap 90 is stamped from metal and has a circular depression 91 with opposed coplanar wings 92,93. The circular depression 91 has an external diameter slightly less than the bore 24. The cap 90 may be introduced into the bore 24 at an angle and inserted above a circular cut-out 94 which is formed when the bore 24 is cut entirely through the bottom sheet of the raceways. The wings 92,93 rest upon the bottom surfaces 15,20 respectively to provide metallic enclosure of the wire passageways.

I claim:

1. An electrical base cup for use in a cylindrical bore disposed intermediate of a pair of adjacent parallel raceways, said base cup having an essentially cylindrical outer wall and including a body portion and two opposed skirts, separator means within the said base cup dividing its interior into a first chamber and a second chamber, and fastening means for securing the said base cup to at least one of said raceways.

2. An electrical base cup according to claim 1 including fastening means on the said body portion for engaging an interior surface of at least one of the said raceways.

3. The base cup of claim 1 including opposing slot means in its inner wall, said separator means being engaged in said slot means.

4. Electrical base cup of claim 1 having a plurality of screw receiving boss elements on its inner wall.

5. The electrical base cup of claim 1 including a plurality of serrated finger elements cut into the wall of the said body portion between said skirts and adapted to be outwardly deformed into engagement with at least one interior surface of at least one of the said raceways.

6. In an electrical distribution system including parallel raceways disposed beneath a building surface, said raceways having a covering comprising a filler, an improved electrical outlet comprising an essentially cylindrical bore extended through said filler intermediate of a pair of said raceways, said bore passing through a side wall of each of the raceways and defining an arcuate opening in the outer wall of said raceways, an electrical base cup as defined in claim 1 being engaged in said bore with each of said skirts extending from a side wall of one raceway to a corresponding side wall of the other raceway, said body portion being engaged with the interior of the said raceways, said first chamber communicating with the first of said raceways and said second chamber communicating with the second of said raceways whereby wiring may be extended beyond the said building surface to the interior of the building from each of said raceways in independent enclosed passages, a dual function electrical outlet providing separate passageways for two different electrical services, said outlet including housing, means for securing said housing to said base cup, said housing having a separator plate dividing its interior into two outlet chambers, said separator plate engaging said separator means of said base cup whereby the said first chamber communicates with one of said outlet chambers and the said second chamber communicates with the other of said outlet chambers, and two apertures in said housing, one each communicating with each of said outlet chambers.

7. An electrical base cup for use in a cylindrical bore disposed intermediate of a pair of adjacent parallel raceways, said bore including an arcuate opening in each of the said raceways, said base cup having an essentially cylindrical outer wall and including a body portion and two opposed skirts, opposing slot means in the inner wall of said base cup, and fastening means for securing the said base cup to at least one of said raceways.

(References on following page)

References Cited

UNITED STATES PATENTS

| | | | |
|---|---|---|---|
| 2,073,490 | 3/1937 | Lewin | 174—81 X |
| 3,053,013 | 9/1962 | Fork | 52—221 |
| 3,303,264 | 2/1967 | Saul et al. | 174—48 |

OTHER REFERENCES

Wiremold Catalog and Wiring Guide No. 18—The Wiremold Company, Hartford, Conn., April 1957, pp. 30-31.

LARAMIE E. ASKIN, *Primary Examiner.*

D. A. TONE, *Assistant Examiner.*

U.S. Cl. X.R.

52—221; 174—96

UNITED STATES PATENT OFFICE
CERTIFICATE OF CORRECTION

Patent No. 3,417,191                                                 December 17, 1968

Frank W. Fork

It is certified that error appears in the above identified patent and that said Letters Patent are hereby corrected as shown below:

Column 2, line 3, "4,110,538" should read -- 3,110,538 --; line 4, "form" should read -- for --; line 35, "ralatively" should read -- relatively --; line 61, "separator" should read -- separation --. Column 3, line 43, "2,949,413" should read -- 2,946,413 --.

Signed and sealed this 17th day of March 1970.

(SEAL)
Attest:

Edward M. Fletcher, Jr.                                  WILLIAM E. SCHUYLER, JR.
Attesting Officer                                                    Commissioner of Patents